(12) United States Patent
Rogers et al.

(10) Patent No.: US 7,206,064 B2
(45) Date of Patent: *Apr. 17, 2007

(54) LASER DOPPLER VELOCIMETER

(75) Inventors: Philip L. Rogers, Potomac, MD (US);
Kerry J. Vahala, San Gabriel, CA (US)

(73) Assignee: Optical Air Data Systems, LLC,
Manassas, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/362,725

(22) Filed: Feb. 28, 2006

(65) Prior Publication Data

US 2007/0064219 A1    Mar. 22, 2007

Related U.S. Application Data

(63) Continuation of application No. 10/334,785, filed on Jan. 2, 2003, now Pat. No. 7,068,355, which is a continuation of application No. 09/702,132, filed on Oct. 31, 2000, now abandoned, which is a continuation of application No. 08/169,129, filed on Dec. 20, 1993, now Pat. No. 6,141,086, which is a continuation-in-part of application No. 07/804,888, filed on Dec. 6, 1991, now Pat. No. 5,272,513.

(51) Int. Cl.
*G01P 3/36* (2006.01)

(52) U.S. Cl. ........................................ 356/28; 356/28.5

(58) Field of Classification Search ................. 359/28, 359/28.5
See application file for complete search history.

(56) References Cited

U.S. PATENT DOCUMENTS

| | | | |
|---|---|---|---|
| 3,915,572 | A | 10/1975 | Orloff |
| 3,963,347 | A | 6/1976 | Segre et al. |
| 4,015,217 | A | 3/1977 | Snitzer |
| 4,355,893 | A | 10/1982 | Chicklis |
| 4,447,149 | A | 5/1984 | Marcus et al. |
| 4,959,837 | A | 9/1990 | Fevrier et al. |
| 4,995,720 | A | 2/1991 | Amzajerdian |
| 5,013,928 | A | 5/1991 | Ikeda et al. |
| 5,027,079 | A | 6/1991 | Desurvire et al. |
| 5,225,925 | A | 7/1993 | Grubb et al. |
| 5,270,929 | A | 12/1993 | Paulson et al. |
| 5,272,513 | A | 12/1993 | Vahala et al. |
| 6,141,086 | A * | 10/2000 | Vahala et al. ............... 356/28.5 |

* cited by examiner

*Primary Examiner*—Mark Hellner
(74) *Attorney, Agent, or Firm*—Clark & Brody

(57) ABSTRACT

A laser Doppler velocimeter is formed using erbium-doped fiber as the lasing medium. The fiber is diode-pumped. By properly modulating the lasing in the fiber, pulses of radiation may be generated. A telescope acts as the transmission device to focus the radiation at a specified point, and may also act as the receiving system for reflected radiation. The portion of the reflected radiation collected by the receiving system is analyzed to determine the Doppler shift caused by aerosols or objects at the focal point of the telescope.

7 Claims, 3 Drawing Sheets

LASER DOPPLER VELOCIMETER

CROSS REFERENCES TO RELATED APPLICATIONS

This application is a continuation of U.S. Ser. No. 10/334,785 filed Jan. 2, 2003, now U.S. Pat. No. 7,068,355 which is a continuation of U.S. Ser. No. 09/702,132, filed Oct. 31, 2000, now abandoned, which is a continuation of U.S. Ser. No. 08/169,129 filed Dec. 20, 1993, now U.S. Pat. No. 6,141,086, which is a continuation-in-part of U.S. application Ser. No. 07/804,888 filed Dec. 6, 1991, now U.S. Pat. No. 5,272,513.

BACKGROUND OF THE INVENTION

This invention relates to laser doppler velocimeters and in particular to a laser doppler velocimeter for measuring the velocity of objects or wind such as to ascertain the speed or relative speed of the object such as an automobile or in the case of wind measurement, the true air speed or wind gradients such as wind shear and having reduced cost and weight and increased eye safety.

Laser doppler velocimetry (LDV) in gases at long ranges has been a subject of investigation for nearly 20 years. For instance, U.S. Pat. No. 3,915,572, issued Oct. 28, 1975, discloses a laser Doppler velocimeter. The basic LDV process compares a reflected beam of light to a reference beam to determine the Doppler shift in the reflected beam. This Doppler shift is then used to measure air speed or gradients such as wind shear. Early velocity measurements were performed in large wind tunnels at distances of a few meters. Subsequent investigations included the measurement of meteorological parameters including wind velocity and turbulence, in part because of their importance to aircraft flight. By the early 1970's, laser doppler velocimeters were operating at ranges of hundreds of meters and, by the early 1980's, measurements were being made at kilometer ranges. These systems were large and weighed hundreds of pounds.

A typical long-range LDV for measuring wind shear includes a source of polarized coherent radiation, such as a $CO_2$, YAG, or argon laser (preferably lasing in the fundamental transverse mode and in a single longitudinal mode), for projecting a first coherent beam of light into a beam shaper. The beam shaper expands and collimates the beam after which the beam enters a telescope. The telescope projects the beam in nearly collimated form.

The telescope focuses the beam to strike an object or airborne particulates at a point of interest, resulting in a scattered beam. A portion of the scattered beam is reflected by the object or aerosols and received either by the telescope or a separate receiver telescope. The scattered beam is then mixed with a separate reference beam of light in an optical mixer.

The optical mixer is typically a photodetector with bandwidth sufficient to detect the Doppler frequency as described below. The reference beam is selected to have a well defined optical frequency. If the scatterer is in motion relative to and along the axis of the telescope, then the scattered beam has a frequency that is shifted by an amount equal to the Doppler frequency.

The mixing process produces an electrical current containing a component whose frequency is the mathematical difference between the frequency of the reference beam and the frequency of the Doppler shifted scattered beam. The difference frequency can therefore be measured by electrical means such as by use of an electrical spectrum analyzer or by use of a frequency counter. Because the Doppler frequency is proportional to the relative velocity component of the telescope and the particulates along the telescope axis and because the proportionality constant is a precise mathematical constant determined entirely by the wavelength of the emitted optical beam, the relative velocity component of the particulates along the telescope axis can be determined once the Doppler frequency is measured.

The reference beam is a derivative or replica of the original transmitted beam. If the reference frequency is equal to the frequency of the transmitted beam, then the mixing process is referred to as homodyne detection and the resulting electrical frequency is equal to the Doppler frequency. If the reference frequency is shifted by a known constant amount, then the mixing process is referred to as heterodyne detection and the electrical current has a frequency equal to the Doppler frequency plus a constant offset frequency. In either case, the Doppler frequency can be measured.

The mixing approach described above, which takes either the heterodyne or homodyne forms, is not only a convenient means of extracting the Doppler signal from the scattered optical wave, but is also the most sensitive means of detecting a very weak optical signal. The electrical current produced by the mixer contains two components that are proportional to the optical power in the reference beam and the scattered beam, respectively, and a third component containing the Doppler signal that is proportional to the geometric mean of the powers in the two optical beams. Other sources of electrical current, such as leakage currents in the detector and Johnson and shot noise currents, may also be present.

Typically, all of the electrical currents present in the mixer current can be viewed as steady in comparison to the Doppler signal current. The detection of the Doppler signal current therefore involves measurement of a time varying current among steady background currents. Because the scattered beam power is very weak and because the telescope collects only a small fraction of what is scattered, this time varying optical signal is small in comparison to the reference beam. The mixing process helps improve detection sensitivity of the small optical signal.

The Doppler electrical current experiences "heterodyne gain" because the mixer forms the mathematical product of the scattered optical wave and the reference optical wave in generating the current. By using a reference beam of sufficient power, the only significant detected electrical currents are the steady current corresponding to the directly detected reference beam and the time varying current containing the Doppler signal.

The detection sensitivity is then determined by the noise characteristics of the reference beam. Therefore, in general, it is of utmost importance that the reference beam be as stable as possible. In practice, very stable laser sources can produce reference beams whose power fluctuations are only several decibels above the shot noise floor. Use of a shot noise limited reference beam can be shown to produce a detection sensitivity in the Doppler mixer that is shot noise limited. This kind of detection arrangement is sometimes referred to as quantum limited detection. With modern laser sources it is possible to come within several decibels of this sensitivity limit using the mixing approach described.

Despite the sensitivity limits involved in optical mixing, the return signals produced by optical scattering from aerosols or objects are so small that special consideration must be given to the optical power transmitted from the source laser. Power considerations have resulted in use of sources such as YAG or $CO_2$ lasers, running Q-switched or continuously, in laser Doppler velocimeters. However, the signal-to-noise level at the optical mixer is influenced by two factors: detection bandwidth and signal level. Larger signal levels are produced when more optical power is transmitted and therefore signal-to-noise is improved by using larger amounts of transmitted optical power. By using longer transmitted pulses of optical power, the frequency bandwidth of the detected signal may be reduced so that noise filtering can be made more effective, and, in turn, the signal-to-noise ratio improved.

Longer pulses may only be used if the reference signal and the scattered Doppler signal are phase coherent over the time duration of the transmitted pulse, which is the case for the laser system of the present invention. The signal-to-noise level at the optical mixer is therefore proportional to the product of transmitted optical power and transmitted pulse duration, or equivalently, optical energy per pulse.

The source of the reference beam is often a major problem in this type of system. Originally, the reference beam is mutually coherent with the output beam. However, over the transit time of the launched beam, the two beams can become decorrelated, which can result in significant measurement error. To overcome this problem in some systems long coherence length lasers are used so that one simply mixes a portion of the laser light split from the source laser with the return wave to attain interference. Alternately, a second laser can be used to generate the reference beam provided that it can be properly phase-locked to the source laser. The laser system described here has sufficient coherence to enable use of the former approach even when the focal distance is as large as several miles.

Another major limitation in the use and application of laser systems to the measurement of wind shear or air speed or objects such as automobiles or baseballs or other objects has been the lack of an eye-safe source of radiation with sufficient energy. The Army medical standard recognizes a relatively high maximum permissible exposure in joules/$cm^2$ at wavelengths in approximately the 1.51–1.56 micron range. YAG and $CO_2$ lasers do not operate in this wavelength range, and thus the power levels and energy per pulse levels necessary for eye-safe operation of these lasers are low.

Lasers based on erbium-doped glass emit radiation in this eye-safe band of wavelengths. Therefore, military laser target range finders and laser target designators are now using flash-pumped erbium laser sources. These systems, like most erbium lasers to date, are based on an erbium-doped glass rod lasing medium that is excited by using a flash pump. Although they operate at a desirable wavelength, erbium lasers are flash-pumped and include discrete optical elements that have alignment, thermal drift, and vibration problems.

Recent developments in the fiber optics field have resulted in lightweight, low cost, highly efficient, erbium-doped glass fiber. These systems can be efficiently pumped by using recently developed laser diodes whose emission wavelengths have been optimized for excitation of erbium-doped glass. The overall laser diode pumped erbium fiber system also eliminates the cooling requirements associated with previous flash-pumped systems. The development of erbium doped fibers has lowered the cost and much of the bulk and optics associated with the use of rods. In addition, fibers, like rods, may be used as amplifiers, energy storage devices, or as the lasing medium in a fiber laser. However, use of optical fiber technology has limitations. Specifically, the fiber has inherent power limitations and is subject to electric field-induced non-linearities at higher optical powers. Using erbium-doped fiber as the laser in a LDV system has not been practical because to obtain the power in the fiber, a large amount of energy must be stored and then the laser Q-switched. The Q-switching leads to uncontrolled dumping of the energy, which can introduce electrical field-induced non-linearities at higher optical powers or could ultimately damage the fiber.

SUMMARY OF THE INVENTION

A wind shear detection, air speed measurement, or object speed measurement apparatus according to the present invention is eye-safe, light weight, and can be easily scaled to high energy per pulse operation. The apparatus comprises a diode laser-pumped erbium-doped glass fiber amplifier for generating and amplifying a beam of coherent optical energy and an optical system coupled to the beam for directing the beam a predetermined distance to a scatterer of radiant energy. The reflected beam is mixed with a reference portion of the beam for determining the velocity of the scatterer. The apparatus may be adapted to measure wind or object speed at multiple predetermined distances by using multiple means for directing the beam of radiant energy.

The present invention comprises several subsystems. In particular, the present invention includes a single frequency erbium fiber laser with Q-switching capability; a Q-switch zeroing control feedback control loop (also referred to as the slow-loop) to periodically establish the high loss configuration of the laser oscillator for Q-switching purposes; Q-switch fire control sequencer electronics and Q-switch pulse fire control electronics; an output-input coupling fiber harness that couples coherent radiation generated in the fiber laser out to the telescope transmit/receive subsystem and also couples radiation that is collected by the telescope into the mixer subsystem; and an optional final optical power amplifier stage with optional pulse shaping modulator; a transmit/receive telescope which both transmits the output optical energy and receives a fraction of the energy scattered by the aerosols or object; and an optical mixer with a low noise electrical amplifier and electrical spectrum analyzer (e.g., a fast Fourier transform processor).

In using this device to measure wind or object velocity in the telescope focal volume, the velocity component that is measured is that component along the axis of the telescope. Therefore, for measurement of the three components of velocity three independent measurements must be made along three noncolinear axes. To accomplish this task three duplicate systems may be used in an independent fashion, or a 1 by 3 optical switch may be used to sequence the launching and collection of radiation through three independent telescopes, or one system could be split three ways if the is sufficient laser energy. The 1 by 3 switch is synchronized with the firing of the laser system so that output pulses are sequenced into the telescopes. If the laser system is firing at a rate of N pulses per second, this approach produces a firing rate of N/3 pulses per second along each telescope axis.

By using optical fiber for both generation of the laser energy as well as wave guiding of the energy, the present invention provides a single, mechanically flexible conduit for light. Therefore, the present invention is inherently immune to vibration and temperature variation, and is free of most of the critical optical alignment requirements of conventional laser systems. The only point at which light leaves the optical fiber system is for projection from the telescope. The transmission telescope is also the reception telescope and thus the aerosol-scattered return beam is automatically aligned with the telescope-fiber optic collection system.

The use of erbium-doped optical fiber also has advantages in terms of the overall energy efficiency of the system. Because diode lasers are now available at the optimal pump wavelength of erbium doped glass, the erbium wave guide can be efficiently end-pumped by launching pump radiation down this wave guide. Thus, the system does not have any thermal cooling requirements and can operate off of a low voltage battery supply.

Rather than approaching the aerosol detection problem in the traditional manner through use of short, high-power, optical pulses, the present invention uses temporally-long, lower-power pulses with the equivalent energy per pulse of a high-power short-pulse system. Thus, the optical power requirements on the laser source are greatly relaxed.

A consequence of using long pulses is that conventional range resolution approaches based on use of short optical pulses are not available. In general, the time delay between transmission of the optical pulse and its detection produces a range value with an accuracy that is no better than the optical pulse width. According to the present invention, the pulse width will, in fact, be many times the range at which aerosols or objects will be sampled. Consequently, another ranging mechanism is required if the system is to operate in such a way that can precisely measure speed at specified distances.

Range resolution in the present invention is provided by using a telescope-fiber optic transmission/collection system. A telescope having an effective aperture (the aperture equal to the beam diameter of the optical beam emerging from the telescope) large enough at the operating wavelength is used so that the air data, wind shear, or object ranges of interest are well within the far field limit of the telescope. By using such apertures, the process of focusing of the transmitted optical beam at a particular distance (the desired range) when combined with collection of the scattered radiation by the same telescope and focusing of the collected radiation into a single mode optical fiber produces automatic range resolution. Only those aerosols or objects within the depth of field of the telescope focus will scatter energy that can be efficiently collected by the telescope-fiber optic collection system. The result is a system that is largely immune to the effects of vibration and background light.

Another interesting aspect of using focus-induced ranging is that the depth of field or "focal volume" for a given telescope aperture increases quadratically with focal distance. Because the solid angle of collection at the receiver telescope decreases inversely as the square of the focal distance, these two factors exactly compensate for one another, leading to a collection efficiency that is range independent. As a result, if the transmitted energy per pulse is sufficient to measure aerosols or objects at one range, then by using this approach, the same power will also be sufficient at any other range provided that this other range is within the near field limit of the telescope. This conclusion does not include the effect of atmospheric turbulence at large distances where the focal volume could span a severely mixed airflow. In this case the signal-to-noise ratio would be degraded by the velocity spread of the airflow in the focal volume.

BRIEF DESCRIPTION OF THE DRAWINGS

Other features and advantages of the invention will be apparent from the following Detailed Description taken in conjunction with the accompanying Drawings, in which.

DETAILED DESCRIPTION

Figure 1:
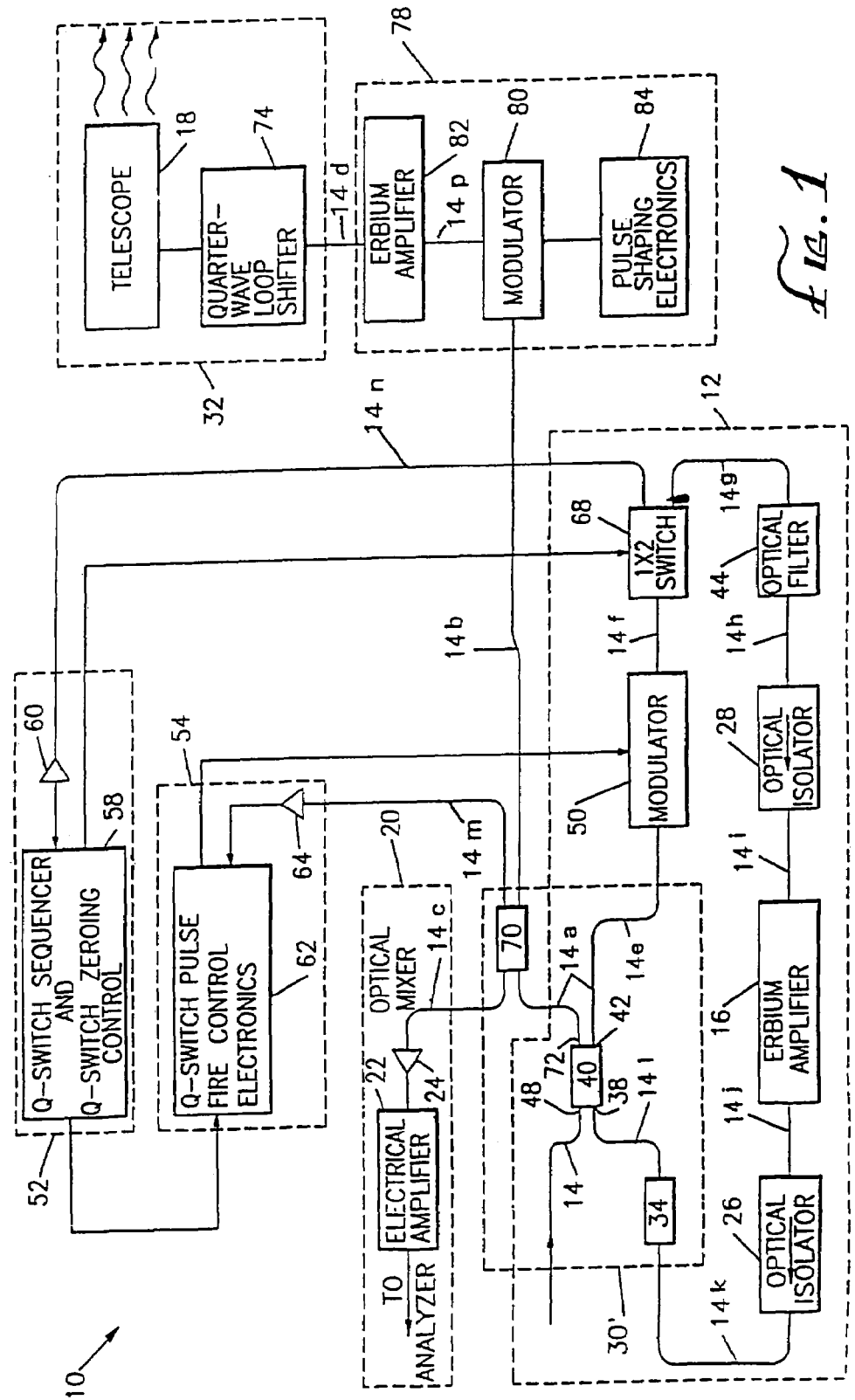
FIG. 1 shows a schematic representation of a preferred embodiment of an apparatus constructed according to the present invention.

According to the present invention a laser Doppler velocimeter 10 is formed from the subsystems depicted in FIG. 1. The components used in this system are commercially available or are available as custom components from various manufacturers. The laser Doppler velocimeter can be configured to operate in four distinct modes. Three of these modes take advantage of the energy storage properties of erbium-doped optical fiber in a different way to produce a high energy coherent pulse of energy using low power commercial laser diode pump sources. A fourth mode operates ring or linear geometry laser devices in a continuous fashion, but at high power through use of very high power laser pump diodes.

Figure 3:
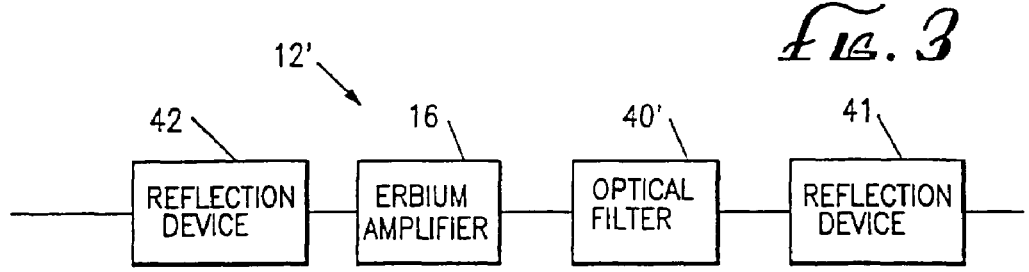
FIG. 3 shows a schematic representation of a single frequency laser oscillator according to the present invention that employs a Fabry-Perot type cavity configuration as opposed to the ring configuration of FIG. 1.

Operational Mode I:

The laser Doppler velocimeter 10 includes a laser 12 formed in a ring geometry as indicated by dashed lines in FIG. 1 or a laser 12' formed in a linear or Fabry-Perot geometry as shown in FIG. 3. The laser subsystem uses an optical wave guide formed from optical fiber 14 as its light guiding mechanism. Optical feedback is produced by using one of the two geometries indicated (ring or linear cavity). Optical gain is produced in the ring or linear geometries by employing an erbium-doped glass optical fiber amplifier 16. The erbium optical fiber amplifier is contiguous with the other fiber 14 in the laser. These elements of the laser are connected by fusion splicing the various optical fiber ends together or by using fiber connectors such as an FCPC type single mode fiber connector. The basic parts of the laser are therefore non-erbium-doped single mode optical fiber and erbium-doped single mode optical fiber spliced or connected together into a ring or linear cavity geometry to produce laser oscillation.

As depicted in FIG. 1, according to the present invention the laser Doppler velocimeter 10 comprises a single frequency erbium-doped fiber laser 12 that operates at a wavelength of approximately 1.54 microns. The laser is Q-switched to produce a long pulse laser beam that passes out of the laser, through a telescope 18 and is reflected off aerosols or objects at the focal point of the telescope. A portion of the reflected beam returns through the telescope 18 and into an optical mixer 20 with a detector 24, a low noise electrical amplifier 22 and an electrical spectrum analyzer (e.g., a fast Fourier transform processor). The Doppler signal of the reflected beam is then detected in the same manner known in the art.

The erbium-doped fiber laser 12 according to one embodiment of the present invention comprises a ring of optical fiber 14. The diode laser pumped erbium amplifier 16 is used to generate the radiation. Optical isolators 26 and 28 are placed in the ring of optical fiber, one on each side of the erbium amplifier, as shown in FIG. 1. These isolators are commercially available devices that allow propagation of light in only one direction. This is necessary in the ring laser because the ring will support laser oscillation in both directions. Counterpropagating modes of oscillation will compete for optical gain and degrade the frequency stability of the laser. In addition, they will reduce the available stored energy that can be extracted by the mode propagating in the desired direction.

From the amplifier 16, the radiation passes through the optical isolator 26 and into an output-input coupling fiber harness 30 that couples coherent radiation generated in the fiber laser to a telescope transmit/receive subsystem 32 and also couples reflected radiation that is collected by the telescope 18 into the optical mixer 20. The harness 30 includes a polarizer 34 connected by optical fiber 14 to the first input 38 of a fiber output coupler 40. The polarizer ensures that the laser 12 will lase in a known linear state of polarization determined by the polarizer. In the linear geometry shown in FIG. 3, a polarizer (not shown) near the output performs the same function as it does in the ring geometry.

The fiber output coupler 40 is a bidirectional fiber coupler that couples a specified fraction of the power circulating in the ring out to the telescope 18. The first input 38 accepts the radiation from the polarizer 34 and transmits it through a first output 42 into the ring. In the linear geometry shown in FIG. 3, the output coupler is replaced by reflection devices 41 and 42 or fiber distributed Bragg reflector (DBR) filters may be used.

The erbium lasers 12 and 12' shown in FIGS. 1 and 3 contain several other components that are used to control and select radiation that is produced by the laser. For instance, an optical filter 44, such as a tandem fiber Fabry-Perot filter (FFP filter), forces the laser oscillator to lase in one longitudinal mode of the ring or <Fabry-Perot cavity (single longitudinal mode operation is sometimes referred to as single frequency operation). In the linear Fabry-Perot geometry, a DBR filter may be used. DBR filters and FFP filters are commercially available devices. Single longitudinal mode operation of the device, as mentioned earlier, is required for accurate, high-sensitivity measurement of the Doppler shifted backscatter radiation from the aerosol particles.

An alternative means to induce single longitudinal mode operation of the ring is to employ an injection seeder (not shown). In this approach, a narrow band optical signal at the desired frequency is injected into a second input 48 of the coupler 40 to stimulate oscillation on a particular longitudinal mode. Although careful attention must be paid to align the injection seeder frequency with the desired longitudinal mode of the laser, this is a viable approach. A single mode distributed feedback or distributed Bragg reflector laser with a wavelength of operation matched to the erbium optical gain peak could be used for this purpose.

The output coupler 40 directs a portion of the beam by optical fiber 14 into a Mach-Zender modulator 50 that is used to control the power of the radiation within the ring. The modulator has a well-defined loss that changes as a function of applied external voltage. The modulator is controlled using two separate systems, a slow loop control 52 and a fast loop control 54.

The slow loop control 52 includes Q-switch fire control sequencer electronics and a Q-switch zeroing control feedback 58 and a detector 60 that are used to periodically establish the high loss configuration of the laser oscillator for Q-switching purposes. The slow loop control is connected to the fast loop control 54 and deactivates and disables the fast loop control to reestablish the zero voltage associated with the modulator 50. The fast loop control includes Q-switch pulse fire control electronics 62 and a detector 64 that monitors the power at a detection point and adjusts the modulator to control the power output.

From the modulator 50, the radiation passes along optical fiber 14 to a 1×2 switch 68. One of the outputs for the 1×2 switch extends to an input of the slow loop control 52. The other output directs the beam through the optical filter 44 and the second optical isolator 28 and then back into the erbium amplifier 16 to complete the ring.

The harness 30 also includes a polarization splitter 70 connected to a second output 72 of the output coupler 40. The output coupler is polarization preserving, and thus the beam transmitted by the coupler into the polarization splitter is similarly polarized. The polarization splitter functions as a polarization selective bidirectional coupler. An outgoing pulse from the ring is generated with a known polarization state.

In one embodiment of the invention, the beam then enters the transmit/receive subsystem 32 that transmits the output optical energy and receives a fraction of the energy scattered by the aerosols or object. A quarter-wave loop shifter 74 rotates the polarization of the beam by 90°. The quarter wave-shifted beam then passes through the telescope 18 and into the atmosphere.

The beam reflects off scattered aerosols or objects at the focal point of the telescope 18 and a portion of the beam is reflected back into the telescope. The reflected radiation again passes through the quarter-wave loop shifter 74 where the polarization of the returning scattered light is rotated another 90°. The resulting beam is then polarized in the complementary linear state to the beam generated by the laser 12. The returning light then passes back through the polarization splitter 70, which directs the returning beam into the optical mixer 20. The signal from the optical mixer passes through the electrical amplifier 22 to the processor or analyzer (not shown) for measurement of Doppler shift as is known in the art.

The polarization splitter 70 and the quarter-wave shifter 74 provide an efficient means of transmitting and receiving optical energy using the same telescope 18 and fiber-optic feed. This is highly desirable for alignment and stability, but the splitter and quarter wave devices are not essential components. A simple polarization maintaining optical coupler could be used in place of the splitter without need of a quarter wave device. However, in this arrangement a certain fraction of the outgoing beam must be lost to allow for coupling of the incoming Doppler signal into the optical mixer. Conversely, the coupling efficiency of the returning signal must be sacrificed to permit transmission of the outgoing light to the telescope and beyond. The optimal optical coupler ratio is 50/50 and leads to an overall degradation of 6 decibels in system performance as opposed to the approach which uses the splitter in conjunction with the quarter wave device.

This mode of operation generates a high energy pulse of coherent optical energy by controlled Q-switching of the erbium laser. In normal Q-switching of a laser oscillator, a switchable loss element is introduced into the laser cavity. The loss is initially made to be large enough so that when the amplifying medium is fully excited (highest possible optical gain condition), its optical gain will be insufficient to cause laser oscillation. In this high loss configuration, energy is stored in the unsaturated optical gain medium.

The loss element is then quickly switched to a condition of low loss. The quality factor or the "Q" of the laser resonator is thereby switched from a very low value to a very large value. The optical gain of the amplifying medium is then many times larger than that required for laser oscillation and optical energy quickly builds in the laser cavity.

Ultimately, the energy stored in the optical gain medium is depleted to a point at which gain is no longer sufficient to support lasing oscillation. At this point the energy buildup ceases and the output power from the laser begins quickly to decrease. Normal Q-switching is thereby characterized by the sudden release of stored energy in the form of an intense, short-lived optical pulse. It is important to note that once the Q-switch is initiated, the process is uncontrolled.

The Q-switch process provides a means of storing energy in the erbium-doped fiber laser 12. For the reasons mentioned earlier sizable amounts of energy can be stored using only low power laser diodes. Q-switching, in its normal uncontrolled form, however, is undesirable for use in a fiber system because the energy release occurs too quickly and results in very high power pulses. Because optical power in an optical fiber is concentrated into a very small cross-sectional area, fiber damage can result. In addition, long before reaching the power levels required to produce catastrophic fiber damage, other equally undesirable effects will occur. These effects are caused by a number of electric field-induced nonlinearities of the silica glass susceptibility function. These nonlinearities will scatter optical energy into other undesired optical modes at other frequencies. The principal low power nonlinearities of concern in fibers are Raman and Brillouin scattering. Of these two, Brillouin scattering is more serious. The threshold for spontaneous Brillouin scattering is expressed as a power length product since the interaction length determines the overall gain available to a Brillouin wave. This power length product must be carefully avoided if the ring laser system is to function properly.

To avoid the deleterious effects of high power pulses in the optical fiber the present invention uses the fast loop control 54 to switch the ring quality factor (the Q) in such a way so as to produce a controlled build up of optical power. By doing this, the optical power pulse duration can be made to persist for periods approaching the radiant lifetime of erbium in glass. For example, one millijoule of optical energy released in one microsecond produces a pulse with a peak power of approximately one kilowatt. The same pulse energy when released in 100 microseconds produces a pulse energy of 10 Watts.

To control the switching process, a fast electronic control is used to stabilize the output power at a set point value. The output power is controlled by the fast loop controller 54. It includes a wide bandwidth photodetector which monitors a fraction of the output power emitted from the laser, an electronic feedback control loop, and the electronically controllable fiber optic modulator 50 to control the laser's internal loss.

The modulator 50 can be a fiber optic pigtailed lithium niobate Mach-Zender type modulator or any other fiber compatible electronically controllable modulator. Because the loss produced by the modulator must be large enough to compensate for the optical gain provided by the erbium amplifier 16 (typically 30 to 40 decibels), the modulator loss (maximum contrast) must be very high. To avoid severe degradation of output power coupling caused by unidirectional operation of the ring, the modulator should be placed after the output coupler 40 in the ring as shown in FIG. 1.

In addition, the output coupler 40 should have a relatively large output coupling ratio so that most of the energy passing through the coupler is not absorbed by the optical modulator 50. The optimal value of output coupling depends on maximum gain and internal fixed loss. Presently, 90% is preferred.

For the same reason, the linear geometry laser 12' shown in FIG. 3 is less suitable for slow Q-switching as described here. In this case the bidirectional propagation of the optical mode through a hypothetical intracavity modulator does not permit efficient output coupling of the pulse energy. Finally, in selecting the modulator maximum loss level, the maximum loss produced by the modulator need be no larger than the maximum small signal gain produced by the erbium amplifier less the fixed losses of the ring.

An additional problem involved in using the modulator is the acquisition of its minimum transmission bias point. Due to thermal drift and other factors this voltage level will slowly fluctuate over time. This leads to degradation of maximum energy storage because the erbium amplifier 16 can only be charged to a gain level (and hence energy level) equal to this maximum modulator loss plus the internal fixed loss of the ring (including the output coupler 40 loss).

Prior to firing the ring (i.e., Q-switching the ring), the ring is opened by switching the 1 by 2 switch 68 so that the optical detector 60 is connected to the output of the modulator 50. A certain amount of amplified spontaneous emission is always emitted by the erbium amplifier 16 and this radiation is sensed by the detector 60 after transmission through the modulator 50. The slow loop control 52 minimizes this detected signal by adjusting the voltage bias to the modulator. When a minimum is established, a flag is set in the slow loop control electronics and the ring can be closed again in preparation for Q-switching.

The Q-switch sequencer control electronics 58 regulate the timing of the fast loop control 54. The Q-switch sequencer control ensures that sufficient time has elapsed between pulses to allow full charging of the erbium amplifier medium, controls the opening of the ring by the 1×2 switch 68, and monitors the "flag" that is set by the slow loop control, inhibiting closure and firing of the ring until the "flag" is set.

In optimizing this system for maximum energy per pulse operation, i.e., maximum extractable energy, several considerations are of importance. The maximum stored energy in the erbium-doped fiber ring under conditions of 100% inversion is proportional to the total number of erbium ions doping the silica core. Stored energy will therefore increase in proportion to the product of erbium doping density, core area, and fiber length.

The small signal net optical gain (i.e., output power divided by input signal power to the amplifier) of the erbium amplifier 16 will vary exponentially with the product of fiber length and doping density. This imposes severe limitations on the use of fiber length and doping density to increase energy storage. These limitations result for two reasons.

First, beyond a certain small signal net gain, the erbium amplifier 16 will experience saturation caused by amplified spontaneous emission (ASE). ASE saturation can be inhibited by use of filters, but at some fiber length or doping density it will always be a consideration. Second, the dynamic control of the ring becomes highly problematic as the net system gain (amplifier gain less fixed system losses) increases beyond 40 decibels. Loss modulators with these extinction ratios are not available commercially so that tandem loss modulators would be required to control the Q-switching process.

Ultimately, the physics of the coherent lasing beam limit the maximum number of modulators possible even by this approach because, beyond a certain attenuation level, the transmitted energy from a sufficiently large number of tandem modulators would be indistinguishable from quantum vacuum noise. In effect, the ring would be open and no longer qualify as a laser. Furthermore, multiple tandem modulators increase the cost of the system.

Erbium fiber could be doped with additional impurities that strongly absorb at and near the peak gain wavelength of erbium. This modified erbium fiber would have a residual smaller gain per unit length at other wavelengths that are well removed from the normal gain peak wavelength. By operating at this wavelength the above problems concerning large gains and ASE saturation do not occur until energy storage levels are much higher. In effect, longer fiber lengths and higher doping densities could be tolerable with such fiber.

One method of increasing energy storage is to increase the fiber core diameter. The energy storage at a fixed doping density will increase quadratically with the core diameter. Because the optical mode field diameter will also scale as the core diameter increases, the optical gain per unit length can actually remain constant as the energy storage is increased by increasing the core diameter. In effect, the increased energy per unit length provided by the fiber is added to a wider mode field so that gain remains constant.

The telescope 18 comprises a lens or series of lenses that focus the laser radiation at varying points. The focal length of the telescope is selected for the intended purpose. For instance, as an air speed indicator, the focal length need only be a few meters. To detect wind shear, a series of lenses with varying focal lengths are used. To detect objects such as automobiles, either a collimated beam (focussed at infinity) or a variable focus lens is used.

Figure 2:
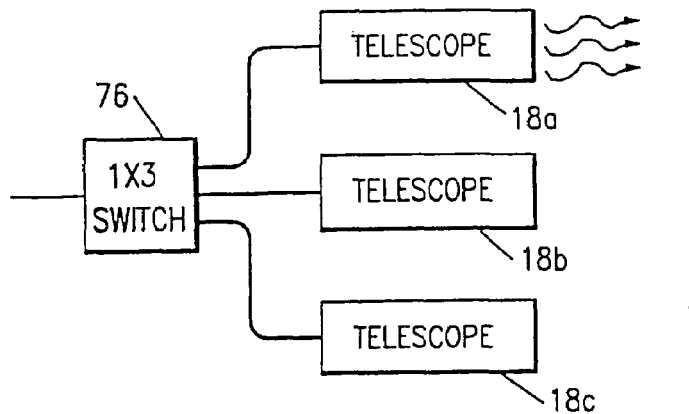
FIG. 2 shows a schematic representation of a 1 by 3 transmit/receive telescope sequencer switching arrangement used in one embodiment of the apparatus in FIG. 1.

To measure the three components of velocity, three independent measurements must be made along three noncolinear axes. Thus, three duplicate systems may be used in an independent fashion, or, as shown in FIG. 2, a 1 by 3 optical switch 76 may be used to sequence launching and collection of radiation through three independent telescopes 18a, 18b, and 18c. The 1 by 3 switch is synchronized with the firing of the laser system 10 so that output pulses are sequenced into the telescopes.

Operational Mode II:

This mode of operation is an extension of the first mode. In this embodiment, the portion of the beam transmitted out of the harness 30 by the output coupler 40 enters an optional optical power amplifier system 78 that includes a second modulator 80 (such as a Mach-Zender modulator) and another erbium amplifier 82. The output power produced by the Q-switched ring is supplemented by the optional amplifier 82. The energy storage considerations in this final amplifier stage include those outlined. The optional amplifier requires a fast switch, such as the second Mach-Zender modulator shown in FIG. 1, that serves as a buffer between the optional amplifier and the laser 12. Pulse shaping electronics 84 may also be included, as discussed in connection with Operational Mode III. The fast switch prevents premature gain saturation produced by amplified spontaneous emission, which leaks out of the laser ring prior to firing. This fast switch would be opened as the laser ring is fired.

Operational Mode III:

In this approach, a master oscillator 90 (see FIG. 5) is operated in a steady state manner and establishes the overall coherence of the system. The output of this oscillator is periodically switched into the input of an amplifier 92, the final stages of which are driven into saturation by the amplified pulse.

Figure 5:
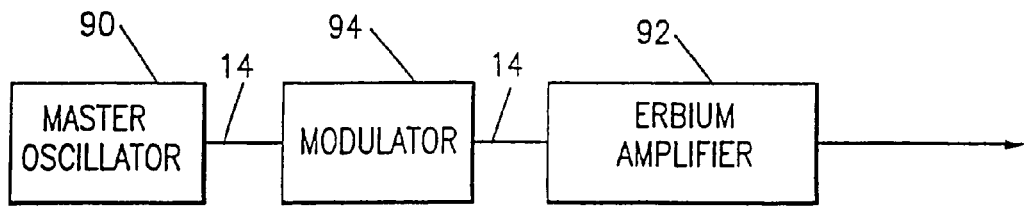
FIG. 5 shows a schematic representation of a master oscillator-power amplifier configuration for a laser-Doppler velocimeter according to the present invention.

The master oscillator 90 in this mode may be, for instance, the erbium ring laser 12 without the Mach-Zender modulator 50 and the 1 by 2 switch 68, the linear. Fabry-Perot type laser 12' described in FIG. 3, or a single frequency semiconductor laser operating at the gain peak wavelength of erbium (a distributed feedback semiconductor laser or distributed Bragg reflector semiconductor laser would suffice). As shown in FIG. 5, the output of the master oscillator is coupled via single mode optical fiber 14 into a loss modulator 94 which is, in turn, coupled to the erbium amplifier 92.

To charge the erbium amplifier 92, the loss modulator 94 is first set to a high loss (i.e., low transmission) point. In a conventional MOPA, the modulator quickly switches to a maximum transmission point after the amplifier has had time to fully charge. The signal quickly grows in power as it traverses the amplifier. Eventually, the signal saturates the amplifier, thereby achieving meaningful energy extraction. The pulse duration is determined by the available energy stored in the amplifier and this extraction rate.

In general, this form of MOPA operation will cause sharpening of an initially flat pulse because amplifier saturation causes greater optical gain to the leading edge of the pulse to be amplified than to the trailing edge. The result is undesirable highly irregular time distribution of optical power in the amplified pulse. Therefore, pulse shaping using the modulator 94 combined with pulse shaping electronics 84 is an integral part of the operation of the fiber optic MOPA system. In effect, the input pulse to the amplifier 92 is shaped to compensate for amplifier induced distortion and to extend the duration of the emitted amplified pulse.

Figure 6:
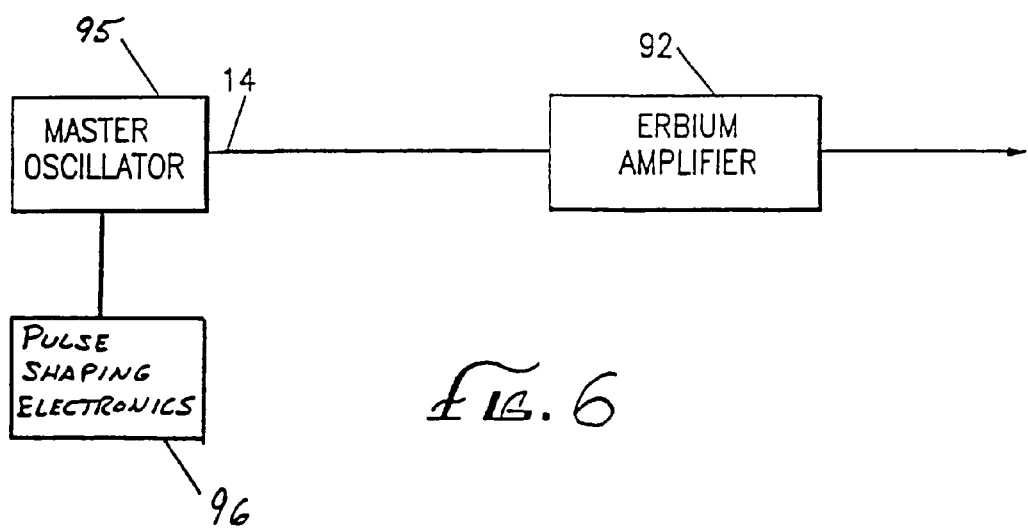
FIG. 6 illustrates an alternate way of operating the embodiment shown in FIG. 5.

Referring to FIG. 6, another alternative method of operation is to activate and deactivate the master oscillator 95 in a series of pulses, thus eliminating the modulator 94. Pulse shaping is obtained by the pulse shaping electronics 96.

Operational Mode IV:

According to this embodiment, the ring laser 12 (FIG. 1) or the Fabry-Perot type laser 12' (FIG. 3) is operated continuously and laser diode pumping is provided that is sufficiently above the lasing threshold to realize high power operation of the laser without any special control such as Q-switching. Thus, the number of necessary parts is reduced. Alternatively, the master oscillator 95 is operated continuously (FIG. 6) without the pulse shaping electronics 96.

In each of the possible modes of operation described here, there are additional components appearing in FIG. 1 that guide the output radiation from the laser 12 to the telescope 18 and that guide the scattered radiation collected by the telescope back to the optical mixer 20. The non-erbium-doped single mode fiber typically comprises a core region of silica glass doped with an element (typically germanium) to increase its refractive index for light guiding purposes; a cladding region also composed of silica glass but typically undoped so as to have a lower refractive index than the inner core region; and a protective plastic jacket to provide mechanical strength to the fiber. The light is guided in the core region, which is typically from 5 to 10 microns in diameter. The cladding region is typically several hundred microns in diameter.

Normal single mode optical fiber will support two polarization states of the optical wave. Because their wave guide propagation constants are nearly degenerate, these two polarization states will couple due to imperfections in the fibers and also as a result of bending-induced birefringence in the fiber core. To eliminate polarization-related instabilities caused by this random coupling, optical fiber containing a built-in birefringence has been developed. This so-called polarization maintaining fiber will propagate two polarization states without coupling provided the states are launched along one of two particular axes of the fiber. Because the mixing process used to detect the Doppler frequency requires that the reference beam and the returning signal beam have the same polarization state for efficient mixing, polarization maintaining fiber is used in part of this system.

The erbium-doped fiber that provides optical amplification in the laser is very similar to the ordinary single mode fiber described above. In addition to the characteristics mentioned above, however, it also contains erbium doping in the core region of the fiber. The doping level typically ranges from 10 to 1000 parts per million of erbium (erbium ions per silica molecule). To excite the erbium in the erbium-doped fiber for the purposes of using it as an optical amplifier, it is necessary to optically pump the core region using certain wavelengths. Optical excitation of erbium-doped glass is most effective at two pump bands: one centered around 1480 nanometers and another centered around 980 nanometers. Laser diodes are now available that emit radiation at these wavelength bands and that have outputs that can be efficiently coupled into single mode optical fiber. In addition, wavelength division multiplexers based on single mode optical fiber are also available that enable this pump radiation to be efficiently coupled into the erbium amplifier without impairing the signal wavelength amplification or transmission in the amplifier.

The signal radiation has a wavelength within the useful amplification band of erbium-doped glass. Erbium-doped fiber amplifiers are now available in several varieties with slightly different performance characteristics and amplification bands. For example, germanium-doped core erbium fiber amplifies around a signal band centered at 1536 nanometers whereas aluminum co-doped core erbium fiber amplifies around a signal band centered on 1533 nanometers.

Figure 4:
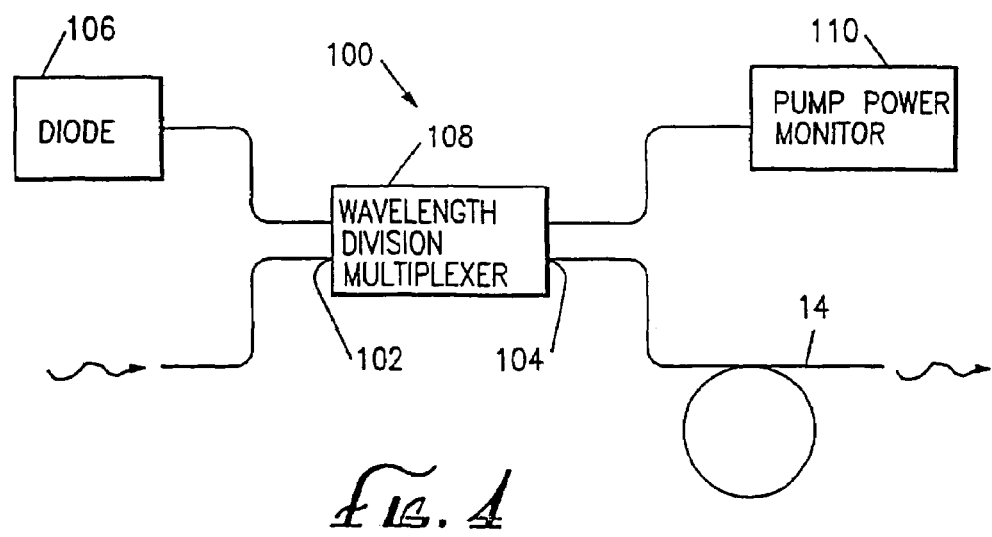
FIG. 4 shows a schematic representation of an erbium-doped fiber amplifier according to another embodiment of the present invention.

A commercially available erbium amplifier module 100 is illustrated schematically in FIG. 4. The components shown in this schematic are contained in the amplifier 16 depicted in FIG. 1. The module has an optical input 102 and an optical output 104 for coupling signal radiation into and out of the module.

The optical pump radiation is coupled from a laser diode 106 into the erbium fiber by first injecting this light into ordinary single mode fiber and then coupling this fiber to a wavelength division multiplexer 108 (which is, itself, two pieces of single mode fiber brought into close proximity). One output of the wavelength division multiplexer is then spliced or connected into the erbium fiber using, for example, an FCPC coupler. The second output is connected to a pump power monitor 110 that is used to monitor the power provided by the pump diode. The overall system will excite the erbium fiber and also provide a means of coupling the signal radiation to be amplified into the excited erbium fiber.

Polarization maintaining erbium-doped fiber has been recently developed by several groups around the world. This fiber is not available commercially as yet, but will have tremendous advantages when used in the present invention. Polarization instabilities caused by bending and random amounts of birefringence in the optical fiber system can be reduced or eliminated by using polarization maintaining fiber. It is therefore envisioned that ultimately the all-fiber laser Doppler velocimeter system 10 described here will be based entirely on polarization maintaining fiber.

In addition to the advantages already mentioned concerning the use of erbium-doped fiber in the present invention, erbium-doped glass is an excellent energy storage medium. The radiative lifetime of an erbium ion in glass is typically in the range 10 to 15 milliseconds. This lengthy lifetime means that energy absorbed from the pump laser diode 106 can be efficiently stored in the erbium-doped glass 14. Furthermore, the radiation can be extracted in a short intense burst of energy or more gradually over a longer period provided this period is less than the radiative lifetime of erbium-doped glass.

Also the optical transition in erbium-doped glass effectively behaves as a homogeneously broadened transition despite the fact that the transition is influenced by both homogeneous and heterogenous broadening mechanisms. A single longitudinal mode in the laser described here can therefore extract energy stored in all of the erbium ions. The energy storage properties of erbium doped glass are used in the laser 12 to produce high energy pulses of light while using relatively low power laser diodes for pumping purposes. These advantages are also obtained in the optional power amplifier 82. This amplifier can be used to further amplify the radiation produced by the main laser oscillator.

The reference signal in this system is preferably generated in one of two ways. The first uses the small reflection produced by the fiber end face at the telescope 18. This reflection is approximately 4% when the fiber is uncoated and can be decreased further with optical coatings or by immersion of the fiber in an index-matching liquid. This approach is feasible provided that the round trip distance to the focal volume is not a significant fraction of the pulse length and provided that this distance does not exceed the coherence length of the outgoing pulse.

The second approach uses a stored replica of the outgoing pulse. The pulse is stored in a length of optical fiber that is adjusted to be equal in length to the round-trip distance to the focal volume as described in U.S. Pat. No. 4,875,770 to Rogers, et al.

From the foregoing, it will be apparent that the present invention provides a laser Doppler velocimeter having reduced weight and cost and increased stability. Furthermore, the laser Doppler velocimeter described can be operated as an interferometer in much the same manner as described with changes to the electronic processing to count fringes produced by the optical mixing process. This laser interferometer has application to precision measurement of distance and vibration. It also will be apparent that, while particular embodiments have been illustrated and described in detail, various modifications and changes may be made by those skilled in the art, within the spirit and scope of the following claims.

The invention claimed is:

1. A laser Doppler velocimeter comprising:
   an optical fiber source of low power comprising: an optical fiber output port;
   a bi-directional optical transmitter-receiver comprising:
   an optical input-output port for transmitting a beam of radiation to be scattered at a predetermined location and for collection a portion of the scattered radiation: and an optical fiber input output port;
   an optical fiber waveguide assembly comprising an optical fiber waveguide input port coupled to said optical fiber output port and an optical fiber output port coupled to said optical fiber input-output port;

a reference signal source:

a detector comprising a detector optical fiber input port for receiving collected scattered radiation and a reference signal; and coupler means forming part of said waveguide assembly for transmitting at least a portion of the collected scattered radiation and a reference signal to the detector optical fiber input port.

2. A laser Doppler velocimeter in accordance with claim 1 characterized in that said source of optical radiation comprises a master oscillator power amplifier optical fiber signal source.

3. A laser Doppler velocimeter in accordance with claim 2 characterized in that said master oscillator is alternatively activated and deactivated to produce temporally long pulses.

4. A laser Doppler velocimeter in accordance with claim 1 characterized in that the detector is an interference fringe counter.

5. A laser Doppler velocimeter in accordance with claim 1 characterized in that the detector is a Doppler frequency detector.

6. A system for measuring atmospheric conditions comprising:

a laser source comprising an optical wave guide formed from a single-mode optical fiber connected to an erbium-doped optical fiber amplifier formed in a ring or linear configuration for providing a beam of coherent laser radiation in the wave guide fiber, and an output optical system for directing said beam of laser radiation to a region for measuring said atmospheric conditions.

7. A system according to claim 6 wherein the wavelength of said beam of laser radiation is between 1.51 and 1.56 microns.

* * * * *